United States Patent
Li (10) Patent No.: US 12,348,315 B2
(45) Date of Patent: Jul. 1, 2025

(54) HARQ-ACK INFORMATION TRANSMISSION METHOD, AND COMMUNICATION DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 286 days.

(21) Appl. No.: 17/784,080

(22) PCT Filed: Dec. 12, 2019

(86) PCT No.: PCT/CN2019/124884
§ 371 (c)(1),
(2) Date: Jun. 9, 2022

(87) PCT Pub. No.: WO2021/114179
PCT Pub. Date: Jun. 17, 2021

(65) Prior Publication Data
US 2023/0055619 A1    Feb. 23, 2023

(51) Int. Cl.
*H04L 1/1812* (2023.01)
*H04W 72/1273* (2023.01)
*H04W 72/23* (2023.01)

(52) U.S. Cl.
CPC ....... *H04L 1/1812* (2013.01); *H04W 72/1273* (2013.01); *H04W 72/23* (2023.01)

(58) Field of Classification Search
CPC .. H04L 1/1812; H04W 72/1273; H04W 72/23
See application file for complete search history.

(56) References Cited

U.S. PATENT DOCUMENTS

| 2018/0019843 | A1 | 1/2018 | Papasakellariou |
| 2021/0176011 | A1* | 6/2021 | Lei .......... H04L 1/1896 |
| 2022/0210817 | A1* | 6/2022 | Karaki .......... H04L 1/1822 |

OTHER PUBLICATIONS

Indian Patent Application No. 202247039417, Office Action dated Nov. 2, 2022, 6 pages.
European Patent Application No. 19955959.2, Search and Opinion dated Nov. 4, 2022, 9 pages.
Mediatek Inc. "Enhancements to HARQ and scheduling for NR-U operation" 3GPP TSG RAN WG1 #99, R1-1912090, Nov. 2019, 9 pages.

(Continued)

*Primary Examiner* — Brian P Cox
(74) *Attorney, Agent, or Firm* — COZEN O'CONNOR (57) ABSTRACT

A method for transmitting hybrid automatic repeat request acknowledgement (HARQ-ACK) information and a communication device are provided. The method includes: receiving first downlink control information (DCI), in which a slot offset information field of the first DCI has a first value; receiving second DCI, in which a slot offset information field of the second DCI has a second value different from the first value; and sending HARQ-ACK information of a physical downlink shared channel (PDSCH) transmission scheduled by the first DCI based on the second DCI, in response to determining that a value of a downlink assignment index (DAI) field included in the second DCI and a value of a DAI field included in the first DCI meet a predetermined condition.

6 Claims, 6 Drawing Sheets

(56) References Cited

OTHER PUBLICATIONS

Intel Corporation "Enhancements to HARQ for NR-unlicensed" 3GPP TSG RAN WG1 Meeting #97, R1-1906787, May 2019, 13 pages.
PCT/CN2019/ 124884 English translation of International Search Report dated Sep. 16, 2020, 2 pages.
Qualcomm Inc. "Summary of NR-U agreements till RAN1 #99"; 3GPP Meeting; R1-1913599; Nov. 2019; 40 pages.

* cited by examiner

HARQ-ACK INFORMATION TRANSMISSION METHOD, AND COMMUNICATION DEVICE

CROSS-REFERENCE TO RELATED APPLICATION

This application is a U.S. national phase of International Application No. PCT/CN2019/124884, filed with the State Intellectual Property Office of P. R. China on Dec. 12, 2019, the entire content of which is incorporated herein by reference.

TECHNICAL FIELD

The disclosure relates to, but is not limited to a field of wireless communication technologies, and particularly to a method for transmitting hybrid automatic repeat request acknowledgement (HARQ-ACK) information, and a communication device.

BACKGROUND

In the 5th-generation New Radio in unlicensed spectrum (5G NR-U) channel, when a base station schedules a physical downlink shared channel (PDSCH) resource (configured as a communication resource of PDSCH), it is required to indicate a resource for transmitting HARQ-ACK corresponding to data transmitted by the PDSCH resource.

A non-numerical slot offset (K1) information field is introduced into downlink control information (DCI) scheduling the PDSCH resource in the 5G NR-U channel. When the K1 information field is used to carry a non-numerical slot offset, it is determined that a user equipment (UE) does not feedback the HARQ-ACK information of the PDSCH scheduled by the current DCI temporarily, and the HARQ-ACK information not fed back is fed back when the UE receives the DCI with the K1 information field carrying a normal numerical slot offset.

SUMMARY

The disclosure provides a method for transmitting hybrid automatic repeat request acknowledgement (HARQ-ACK) information, an apparatus for transmitting hybrid automatic repeat request acknowledgement (HARQ-ACK) information and a communication device.

According to a first aspect of embodiments of the disclosure, a method for transmitting hybrid automatic repeat request acknowledgement (HARQ-ACK) information is provided. The method includes: receiving first downlink control information (DCI), in which a slot offset information field of the first DCI has a first value; receiving second DCI, in which a slot offset information field of the second DCI has a second value different from the first value; and sending HARQ-ACK information of a physical downlink shared channel (PDSCH) transmission scheduled by the first DCI based on the second DCI, in response to determining that a value of a downlink assignment index (DAI) field included in the second DCI and a value of a DAI field included in the first DCI meet a predetermined condition.

According to a second aspect of the embodiments of the disclosure, a method for transmitting HARQ-ACK information is provided. The method includes transmitting first DCI, in which a slot offset information field of the first DCI has a first value; transmitting second DCI, in which a slot offset information field of the second DCI has a second value different from the first value, when the second DCI is used to transmit HARQ-ACK information of a physical downlink shared channel (PDSCH) transmission scheduled by the first DCI, a value of a downlink assignment index (DAI) field included in the second DCI and a value of a DAI field included in the first DCI meet a predetermined condition; and receiving the HARQ-ACK information of the PDSCH transmission scheduled by the first DCI based on the second DCI, in response to determining that the value of the DAI field included in the second DCI and the value of the DAI field included in the first DCI meet the predetermined condition.

According to a third aspect of the embodiments of the disclosure, an apparatus for transmitting HARQ-ACK information is provided. The apparatus includes a first receiving module and a first sending module. The first receiving module is configured to receive first downlink control information (DCI), in which a slot offset information field of the first DCI has a first value; and receive second DCI, in which a slot offset information field of the second DCI has a second value different from the first value. The first sending module is configured to send HARQ-ACK information of a physical downlink shared channel (PDSCH) transmission scheduled by the first DCI based on the second DCI, in response to determining that a value of a downlink assignment index (DAI) field included in the second DCI and a value of a DAI field included in the first DCI meet a predetermined condition.

According to a fourth aspect of the embodiments of the disclosure, an apparatus for transmitting HARQ-ACK information is provided. The apparatus includes a second sending module and a second receiving module. The second sending module is configured to transmit first DCI, in which a slot offset information field of the first DCI has a first value; and transmit second DCI, in which a slot offset information field of the second DCI has a second value different from the first value, when the second DCI is used to transmit HARQ-ACK information of a physical downlink shared channel (PDSCH) transmission scheduled by the first DCI, a value of a downlink assignment index (DAI) field included in the second DCI and a value of a DAI field included in the first DCI meet a predetermined condition. The second receiving module is configured to receive the HARQ-ACK information of the PDSCH transmission scheduled by the first DCI based on the second DCI, in response to determining that the value of the DAI field included in the second DCI and the value of the DAI field included in the first DCI meet the predetermined condition.

According to a fifth aspect of the embodiments of the disclosure, a communication device is provided. The communication device includes: a receiver; a memory and a processor. The processor is respectively coupled to the receiver and the memory, configured to execute computer executable instructions stored on the memory, control the receiver to receive and send wireless signals, and implement the method for transmitting HARQ-ACK information provided in the first aspect or the second aspect.

According to a sixth aspect of the embodiments of the disclosure, a computer storage medium is provided. The computer storage medium is stored with computer executable instructions. After the computer executable instructions are received by a processor, the method for transmitting HARQ-ACK information provided in the first aspect and/or the second aspect is implemented.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

Figure 1:
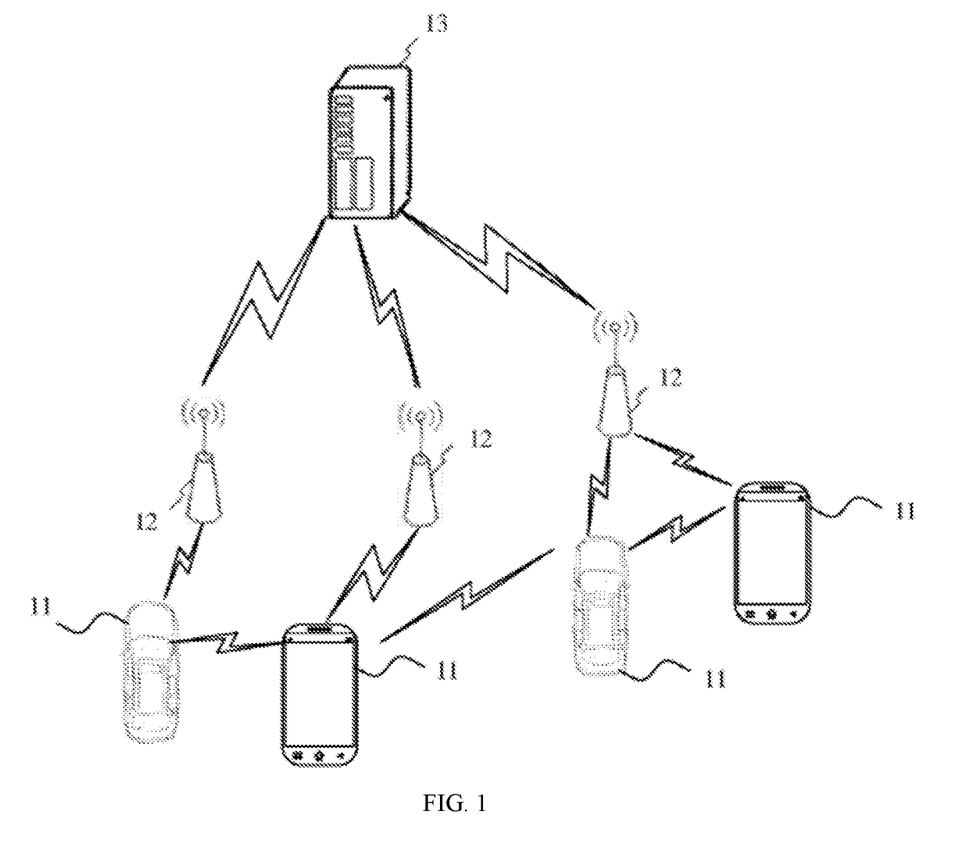
FIG. 1 is a schematic diagram illustrating a wireless communication system according to an embodiment of the disclosure.

With reference to FIG. 1, FIG. 1 is a schematic diagram illustrating a wireless communication system according to an embodiment of the disclosure. As illustrated in FIG. 1, the wireless communication system is a communication system based on the cellular mobile communication technology. The wireless communication system may include several UEs 11 and several base stations 12.

The UE 11 may be a device that provides voice and/or data connectivity to a user. The UE 11 can communicate with one or more core networks via a radio access network (RAN). The UE 11 can be an IoT UE, such as a sensor device, a mobile phone (or a cellular phone), and a computer having an IoT UE, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the UE 11 may also be a device of an unmanned aerial vehicle. Alternatively, the UE 11 may also be an in-vehicle device, for example, the UE 11 may be a vehicle-mounted computer with a wireless communication function, or a wireless communication device externally connected to a vehicle-mounted computer. Alternatively, the UE 11 may also be a roadside device, for example, a road light with a wireless communication function, a traffic light or other roadside devices and so on.

The base station 12 may be a network side device in the wireless communication system. The wireless communication system may be a 5th generation (5G) system, also known as the new radio (NR) system or 5G NR system. Alternatively, the wireless communication system may also be a system supporting an NR-U communication. Alternatively, the wireless communication system may also be a next-generation system of the 5G system. An access network in the 5G system may be called as a new generation radio access network (NG-RAN).

The base station 12 may be a base station (gNB) adopting a centralized and distributed architecture in the 5G system. When the base station 12 adopts the centralized and distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 12.

A wireless connection can be established between the base station 12 and the UE 11 through a wireless air interface. In different embodiments, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the UEs 11. In some embodiments, the above wireless communication system may further include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

Figure 2:
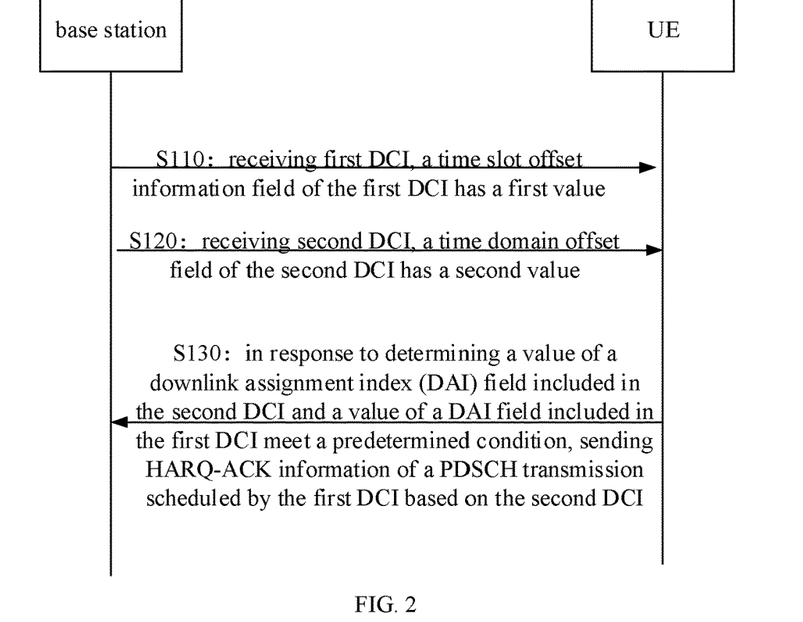
FIG. 2 is a flowchart illustrating a method for transmitting HARQ-ACK information according to an embodiment of the disclosure.

FIG. 2 is a flowchart illustrating a method for transmitting HARQ-ACK information according to an embodiment. As illustrated in FIG. 2, the method includes the following.

At block S110, first DCI is received. A slot offset information field of the first DCI has a first value.

At block S120, second DCI is received. A slot offset information field of the second DCI has a second value.

At block S130, in response to determining a value of a downlink assignment index (DAI) field included in the second DCI and a value of a DAI field included in the first DCI meet a predetermined condition, HARQ-ACK information of a PDSCH transmission scheduled by the first DCI is sent based on the second DCI.

Each of the first DCI and the second DCI belongs to a type of DCI. The terms "first" and "second" used here are merely used to distinguish DCIs with different contents or DCIs transmitted at different times. However, in the embodiments of the disclosure, a value of a K1 field of the first DCI is different from a value of a K1 field of the second DCI.

The method described in the embodiment may be applied in a UE, and the method for transmitting HARQ-ACK information described here can be applied in a scenario of licensed spectrum channels or unlicensed spectrum channels.

In the scenario of licensed spectrum channels, the PDSCH transmission, and transmission of the DCI and the HARQ-ACK information are performed on the licensed spectrum channel.

In the scenario of unlicensed spectrum channels, the PDSCH transmission, and transmission of the DCI and the HARQ-ACK information are performed on the unlicensed spectrum channel.

The UE in the embodiment may be various kinds of UEs, for example, an ordinary mobile terminal, a machine type communication (MTC) terminal, and the like. The ordinary mobile terminal may include a phone, a tablet computer, or a wearable device. The MTC terminal includes but is not limited to a smart IoT device. The IoT device includes but is not limited to a smart water meter and/or a smart electricity meter.

The HARQ-ACK information may include acknowledge (ACK) information for indicating a success transmission, or may be non-acknowledge (NACK) information for indicating a failed transmission.

The HARQ-ACK information of multiple PDSCH transmissions may be carried in a same HARQ-ACK codebook and fed back to the base station.

The PDSCH transmission is downlink data transmitted using a PDSCH resource.

The DCI includes a K1 information field. The value carried in the K1 information field may have two possible kinds of values. One kind is the first value, and the other kind is the second value. Here, there may be one or more first values, and there may be one or more second values. For example, the first value may be one of possible values that can be carried in the K1 information field. For example, the K1 information field includes three binary bits, and the values carried in the K1 information field may range from 0 to 7. In this case, the first value may be any one of 0 to 7. For example, the first value may be 0, while the second value may be any of 1 to 7.

If there is one first value, other values in the K1 information field may be considered as the second value, such that the second value has a big value range, and a maximum schedule flexibility may be maintained when the base station schedules the PUCCH resource based on the K1 information field for uploading the HARQ-ACK information.

If the K1 information field carries the first value, the first value indicates that sending of the HARQ-ACK information is not triggered. The HARQ-ACK information may be HARQ-ACK information sent based on a one shot HARQ-ACK feedback mechanism. The one shot HARQ-ACK feedback mechanism may refer to a HARQ-ACK sending mechanism with which HARQ-ACK information for all HARQ processes is sent once. In the embodiments of the disclosure, the HARQ-ACK information reported by the UE may also be a feedback mechanism other than the one shot HARQ-ACK feedback mechanism. For example, only the HARQ-ACK information of an HARQ process corresponding to downlink data currently already transmitted is reported.

If the K1 information field carries the second value, it indicates that sending of HARQ-ACK is triggered.

In some embodiments, the second value is different from the first value.

In the embodiments of the disclosure, the first DCI received by the UE is DCI with the K1 information field having the first value, and the second DCI received after the first DCI is DCI with the K1 information field having the second value.

Since the K1 information field of the second DCI carries the second value, the UE is triggered to report the HARQ-ACK information of the PDSCH transmission scheduled by the first DCI. The base station may transmit many second DCIs. When the base station sends multiple second DCIs each with the K1 information field carrying the second value to one UE in temporal sequence, if a miss detection of the UE occurs in the second DCI firstly sent by the base station or occurs in multiple second DCIs including the second DCI firstly sent by the base station, the UE may misunderstand the DCI firstly received by itself as the second DCI firstly sent by the base station. In the related art, the UE may send the HARQ-ACK information based on an HARQ-ACK resource position indicated by the DCI firstly received by the UE, in this case, the base station cannot receive the HARQ-ACK information, because the base station uses the DCI firstly sent by itself (a miss detection of the UE occurs in the DCI) to indicate the resource for transmitting HARQ-ACK. Further, the base station may actually prepare to use the PUCCH resource for sending the HARQ-ACK by the UE to send uplink information (including control information and data information) to another UE. The UE incorrectly occupies the resource, such that the uplink transmission for another UE may be affected. With the method provided in the embodiments of the disclosure, occurrence of the above problem may be reduced, and thus reducing occurrence of a phenomenon where one UE occupies the PUCCH resources used by other UEs to transmit the HARQ-ACK information and a resulting phenomenon where the base station has a big interference on the HARQ-ACK information of other UEs.

In the embodiments of the disclosure, in order to ensure that the UE is triggered by the second DCI sent by the base station to the UE to report the HARQ-ACK information, and to reduce occurrence of a situation of the UE occupying the PUCCH resource for reporting the HARQ-ACK information by another UE caused by a miss detection of the UE occurring in the second DCI sent by the base station to the UE, in block S130 of the embodiment of the disclosure, it is determined whether the value carried by the DAI field of the first DCI and the value carried by the DAI field of the second DCI meet the predetermined condition.

For example, a difference between the value carried by the DAI field of the first DCI and the value carried by the DAI field of the second DCI is a predetermined value, for example, the predetermined value may be 1 or a maximum value that can be carried by the DAI field minus 1.

Here, this is only one example for illustrating that the value of the DAI field of the first DCI and the value of the DAI field of the second DCI meet the predetermined condition, but other implementations are possible, which is not limited herein.

In the embodiments of the disclosure, the DAI may be configured to count the number of PDSCH transmissions for which the HARQ-ACK information is fed back in a same HARQ-ACK codebook.

For example, in some embodiments, the DAI may include S bits. The S bits may represent $2^S$ values. For example, when S=2, the DAI may carry four values, which include 0, 1, 2 and 3.

If the DAI field of the first DCI currently received by the UE carries "0", the DAI field of the second DCI currently received by the UE carries "2", and the difference of the value of the DAI field of the first DCI and the value of the DAI field of the second DCI being 1 or 3 represents the predetermined condition is met, the UE may know that the second DCI currently received by the UE is not the DCI for scheduling the PUCCH resource of the PDSCH transmission indicated by the first DCI and a miss detection of the UE may occur in a certain second DCI. Accordingly, the UE does not use the PUCCH resource scheduled by the current second DCI with the DAI filed having the value "2" to transmit the HARQ-ACK information of the PDSCH transmission scheduled by the first DCI, so as to reduce interference on reporting the HARQ-ACK information by other UEs, and improve a success rate of reporting the HARQ-ACK information by other UEs.

Block S130 may include determining a time slot offset between a time slot of the PDSCH transmission and a time slot of transmission of the HARQ-ACK information of the PDSCH transmission based on the second value carried by the K1 information field of the second DCI; and determining the PUCCH resource for carrying the HARQ-ACK information based on a value of a PUCCH resource indicator (PRI) information field carried by the second DCI. For example, the PRI information field indicates a resource index of the PUCCH resource.

A resource set including PUCCH resources for carrying the HARQ-ACK information is determined based on a bit occupied by the HARQ-ACK information to be fed back.

In this way, in block S130, the PUCCH resource for transmitting the HARQ-ACK information of the PDSCH transmission scheduled by the first DCI is determined by combining the K1 information field and the PRI information of the second DCI, and a bit number included by the HARQ-ACK information to be transmitted, and the HARQ-ACK information is sent on the determined PUCCH resource.

In some embodiments, the DAI field included in the first DCI has a value of M1, the DAI field included in the second DCI has a value of M2. M1 and M2 are natural numbers. The natural number may include 0 or a positive number.

Determining that the value of the DAI field included in the second DCI and the value of the DAI field included in the first DCI meet the predetermined condition includes determining that the value of the DAI field included in the second DCI and the value of the DAI field included in the first DCI meet the predetermined condition in response to M2=(M1+1) mod N, where N is a number of values that can be indicated by the DAI field.

Here, mod represents a modulo operation.

Accordingly, when the UE receives the second DCI, it is determined based on the value of the DAI field of the first DCI and the value of the DAI field of the currently received second DCI whether the current second DCI is the DCI for scheduling the UE to transmit the HARQ-ACK information of the PDSCH scheduled by the first DCI. If yes, the HARQ-ACK information of the PDSCH transmission scheduled by the first DCI is reported based on the second DCI. When the base station sends multiple second DCIS each with K1 having the second value to one UE in temporal sequence, and the miss detection of the UE occurs in the firstly sent second DCI of the base station or occurs in multiple second DCIS including the firstly sent second DCI of the base station, the UE may misunderstand its firstly received DCI as the firstly sent second DCI of the base station. In the related art, the UE may send the HARQ-ACK information based on the HARQ-ACK resource position indicated by its firstly received DCI, and the base station cannot receive this HARQ-ACK information because the base station uses its firstly sent DCI (a miss detection of the UE occurs in the DCI) to indicate the resource for transmitting HARQ-ACK. In addition, the base station may actually prepare to use the PUCCH resource for sending HARQ-ACK by the UE to send uplink information (including control information and data information) to another UE. The UE incorrectly occupies the resource, such that the uplink transmission for another UE may be affected. With the method provided in the embodiments of the disclosure, occurrence of the above problem may be reduced, and thus reducing occurrence of a phenomenon where the UE occupies the PUCCH resources used by other UEs to transmit the HARQ-ACK information and a resulting phenomenon where the base station has a big interference on the HARQ-ACK information of other UEs.

Figure 3:
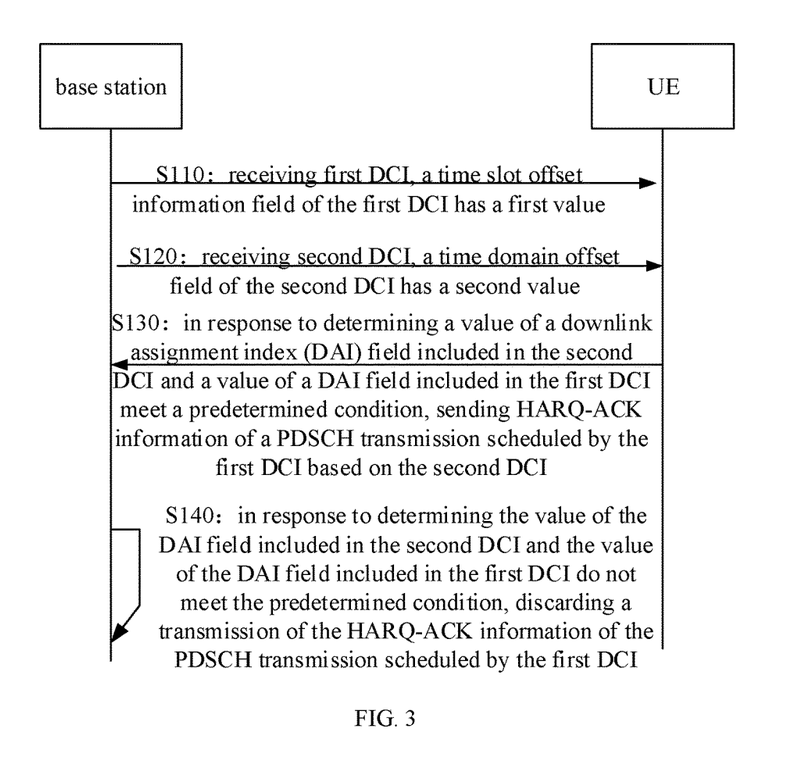
FIG. 3 is a flowchart illustrating a method for transmitting HARQ-ACK information according to an embodiment of the disclosure.

In some embodiments, as illustrated in FIG. 3, the method may further include the followings.

At block S140, in response to determining the value of the DAI field included in the second DCI and the value of the DAI field included in the first DCI do not meet the predetermined condition, a transmission of the HARQ-ACK information of the PDSCH transmission scheduled by the first DCI is discarded.

Here, discarding the transmission of the HARQ-ACK information of the PDSCH transmission scheduled by the first DCI includes discarding the transmission of the HARQ-ACK information on the PUCCH resource scheduled by the second DCI, in which the value of the DAI field of the second DCI and the value of the DAI field of the first DCI do not meet the predetermined condition.

The method provided in the embodiments of the disclosure is applied in a scenario of unlicensed spectrum channels, after the base station transmits one or more first DCIs with the K1 information field having the first value within one channel occupied time (COT) occupied by the base station, the UE may continue listening in to the PDCCH channel within the COT and the UE typically considers its firstly received DCI with the K1 information field having the first value (i.e., the second DCI described above) as the DCI for scheduling itself to transmit the HARQ-ACK information. However, in the embodiments of the disclosure, a further checking is performed, i.e., it is determined based on the value of the DAI field of each of the two DCIs whether the currently received second DCI is the DCI for scheduling the UE to upload the HARQ-ACK information of the PDSCH scheduled by the first DCI, such that occurrence of incorrectly occupying the PUCCH resource for uploading the HARQ-ACK information is reduced. In some embodiments, if one UE finds that the value of the DAI field of the second DCI received by itself and the value of the DAI field of the first DCI do not meet the above predetermined condition, if the UE wants to upload its own HARQ-ACK information, the UE may inform the base station by occupying an unlicensed spectrum channel, such that the base station may re-schedule the PUCCH resource for transmitting the HARQ-ACK information. Or, after the UE receives the second DCI which does not meet the above predetermined condition together with the first DCI, the UE may consider that the second DCI for scheduling itself to transmit the HARQ-ACK information is not received yet, the UE may continue listening in to the PDCCH of the unlicensed spectrum channel, until the COT during which the base station occupies the unlicensed spectrum channel ends.

For example, the UE may not request retransmission additionally based on a reception situation of the PDSCH transmission, for example, the UE finds that the reception is correct and it is unnecessary to receive again, the UE may determine that it is unnecessary to report the HARQ-ACK information even the second DCI for scheduling HARQ-ACK information feedback is missed. If the UE determines one or more PDSCH transmissions need to be retransmitted based on the reception situation of the PDSCH transmission, additional HARQ-ACK information for triggering the retransmission is sent.

In the embodiments of the disclosure, if the UE determines to completely discard the transmission of the HARQ-ACK information of the PDSCH transmission scheduled by the first DCI, the UE may discard the HARQ-ACK information, for example releasing a storage space of storing the HARQ-ACK information of the PDSCH transmission scheduled by the first DCI.

Figure 4:
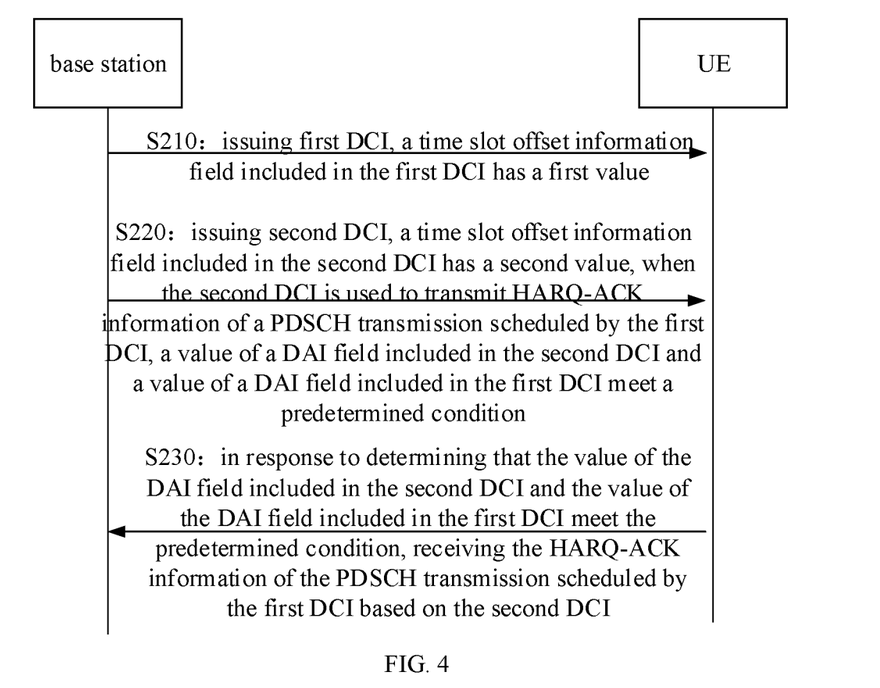
FIG. 4 is a flowchart illustrating a method for transmitting HARQ-ACK information according to an embodiment of the disclosure.

As illustrated in FIG. 4, a method for transmitting HARQ-ACK information is provided according to an embodiment of the disclosure. The method includes the followings.

At block S210, first DCI is transmitted. A slot offset information field included in the first DCI has a first value.

At block S220, second DCI is transmitted. A slot offset information field included in the second DCI has a second value. When the second DCI is used to transmit HARQ-ACK information of a PDSCH transmission scheduled by the first DCI, a value of a DAI field included in the second DCI and a value of a DAI field included in the first DCI meet a predetermined condition.

At block S230, in response to determining that the value of the DAI field included in the second DCI and the value of the DAI field included in the first DCI meet the predetermined condition, the HARQ-ACK information of the PDSCH transmission scheduled by the first DCI is received based on the second DCI.

The method for transmitting HARQ-ACK information may be applied in a base station. The base station may include various types of base stations, for example, eNB or gNB or the like.

The base station may transmit the first DCI and the second DCI. Typically, a time of transmitting the first DCI is earlier than a time of transmitting the second DCI.

If the second DCI currently transmitted is the DCI for scheduling transmission of the HARQ-ACK information of the PDSCH transmission triggered by the first DCI, the value of the DAI field of the second DCI may be determined based on the value of the DAI field of the first DCI, so that the value of the DAI field of the first DCI and the value of the DAI field of the second DCI meet the predetermined condition, so as to assist the UE in determining whether the second DCI currently received is a DCI for scheduling the PUCCH resource used by itself to upload the HARQ-ACK information, thus reducing occurrence of a phenomenon where the UE incorrectly occupies the resources and reducing occurrence of a phenomenon where the transmissions of HARQ-ACK information are poor due to incorrect occupancy of the resources.

In some embodiments, the value of the DAI field included in the first DCI is M1, the value of the DAI field included in the second DCI is M2, where M1 and M2 are both natural numbers.

Determining that the value of the DAI field included in the second DCI and the value of the DAI field included in the first DCI meet the predetermined condition includes determining that the value of the DAI field included in the second DCI and the value of the DAI field included in the first DCI meet the predetermined condition in response to $M2=(M1+1) \bmod N$, where N is the number of values that can be indicated by the DAI field.

For example, if the DAI field is indicated by 2 bits, then the DAI may represent four values. In this case, the value M1 of the DAI field included in the first DCI and the value M2 of the DAI field included in the second DCI need to meet a function formula of $M2=(M1+1) \bmod 4$.

In some embodiments, the method further includes: in response to determining that the value of the DAI field included in the second DCI and the value of the DAI field included in the first DCI meet the predetermined condition and a failure of receiving the HARQ-ACK information of the PDSCH transmission scheduled by the first DCI based on the second DCI occurs, determining a transmission failure of the HARQ-ACK information of the PDSCH transmission scheduled by the first DCI.

For example, if the transmission failure of the HARQ-ACK information is determined, the base station does not receive the HARQ-ACK information or ask for a request for scheduling a transmission resource of the HARQ-ACK information after an interval of a time period from the PUCCH resource configured to transmit the HARQ-ACK information, the base station may determine that the UE correctly receives the PDSCH transmission scheduled by the first DCI.

Figure 5:
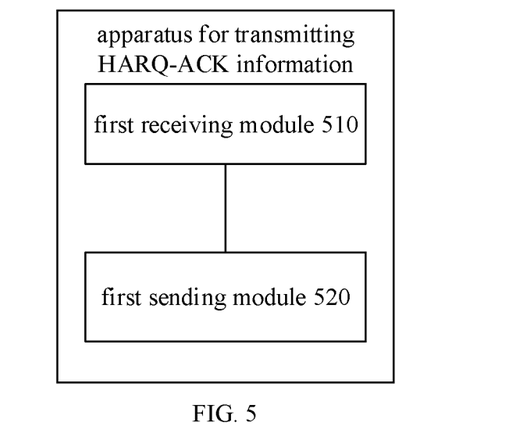
FIG. 5 is a block diagram illustrating an apparatus for transmitting HARQ-ACK information according to an embodiment of the disclosure.

As illustrated in FIG. 5, an apparatus for transmitting HARQ-ACK information is provided according to an embodiment of the disclosure. The apparatus includes a first receiving module 510 and a first sending module 520.

The first receiving module 510 is configured to receive first downlink control information (DCI), in which a slot offset information field of the first DCI has a first value; receive second DCI, in which a slot offset field of the second DCI has a second value different from the first value.

The first sending module 520 is configured to send HARQ-ACK information of a physical downlink shared channel (PDSCH) transmission scheduled by the first DCI based on the second DCI, in response to determining that a value of a downlink assignment index (DAI) field included in the second DCI and a value of a DAI field included in the first DCI meet a predetermined condition.

In some embodiments, the first receiving module 510 and the first sending module 520 are both program modules, which may implement the reception of the first DCI and the second DCI and the transmission of the HARQ-ACK information described above when executed by a processor.

In other embodiments, the first receiving module 510 and the first sending module 520 are both software and hardware combined modules, which include but are not limited to programmable arrays, including but be not limited to complex programmable arrays or field programmable arrays.

In further embodiments, the first receiving module 510 and the first sending module 520 may be hardware modules, for example, including application-specific integrated circuits.

In some embodiments, the value of the DAI field included in the first DCI is M1, the value of the DAI field included in the second DCI is M2, where M1 and M2 are both natural numbers.

Determining that the value of the DAI field included in the second DCI and the value of the DAI field included in the first DCI meet the predetermined condition includes determining that the value of the DAI field included in the second DCI and the value of the DAI field included in the first DCI meet the predetermined condition in response to M2=(M1+1) mod N, where N is the number of values that can be indicated by the DAI field.

In some embodiments, the apparatus further includes a discarding module, configured to discard sending the HARQ-ACK information of the PDSCH transmission scheduled by the first DCI in response to determining that the value of the DAI field included in the second DCI and the value of the DAI field included in the first DCI do not meet the predetermined condition.

In some embodiments, the second value is different from the first value.

For example, the first value is 0, and the second value is any positive integer configured to indicate an offset between a time slot of the PDSCH transmission scheduled by the first DCI and a time slot of the HARQ-ACK information of the PDSCH transmission scheduled by the first DCI.

Figure 6:
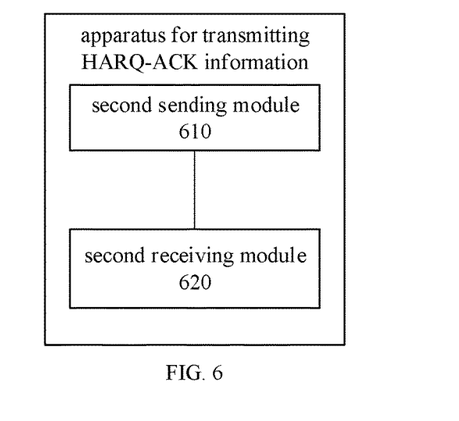
FIG. 6 is a block diagram illustrating an apparatus for transmitting HARQ-ACK information according to an embodiment of the disclosure.

As illustrated in FIG. 6, an apparatus for transmitting HARQ-ACK information is provided according to an embodiment of the disclosure. The apparatus includes a second sending module 610 and a second receiving module 620.

The second sending module 610 is configured to transmit first DCI, in which a slot offset information field of the first DCI has a first value; and transmit second DCI, in which a slot offset information field of the second DCI has a second value different from the first value, when the second DCI is used to transmit HARQ-ACK information of a physical downlink shared channel (PDSCH) transmission scheduled by the first DCI, a value of a downlink assignment index (DAI) field included in the second DCI and a value of a DAI field included in the first DCI meet a predetermined condition.

The second receiving module 620 is configured to receive the HARQ-ACK information of the PDSCH transmission scheduled by the first DCI based on the second DCI, in response to determining that the value of the DAI field included in the second DCI and the value of the DAI field included in the first DCI meet the predetermined condition.

In some embodiments, the second value is different from the first value.

In some embodiments, the second receiving module 620 and the second sending module are both program modules, which may implement the transmitting of the first DCI and the second DCI and the reception of the HARQ-ACK information described above when executed by a processor.

In other embodiments, the second receiving module 620 and the second sending module 610 are both software and hardware combined modules, which include but are not limited to programmable arrays, including but be not limited to complex programmable arrays or field programmable arrays.

In further embodiments, the second receiving module 620 and the second sending module 610 may be hardware modules, for example, including application-specific integrated circuits.

In some embodiments, the value of the DAI field included in the first DCI is M1, the value of the DAI field included in the second DCI is M2, where M1 and M2 are both natural numbers.

Determining that the value of the DAI field included in the second DCI and the value of the DAI field included in the first DCI meet the predetermined condition includes determining that the value of the DAI field included in the second DCI and the value of the DAI field included in the first DCI meet the predetermined condition in response to M2=(M1+1) mod N, where N is the number of values that can be indicated by the DAI field.

A specific embodiment is provided below in combination with any of the above embodiments.

In the 5G NR, when a base station schedules a PDSCH transmission, the base station needs to indicate a feedback resource for transmitting HARQ-ACK information corresponding to the PDSCH transmission. A DCI for scheduling the PDSCH transmission includes a K1 information field and a PRI information field. The K1 value indicates an interval between a time slot of HARQ-ACK information and a time slot of the PDSCH. The PRI information field indicates an identification (ID) of a PUCCH resource for carrying the HARQ-ACK information. The time slot of the PUCCH resource for carrying the HARQ-ACK information may be determined based on indication of the K1 in the DCI.

An index of a PUCCH resource set (i.e., an ID of the PUCCH resource set) may be determined based on the number of bits of representing the HARQ-ACK information to be fed back.

Since the number of bits of representing the HARQ-ACK is common information known by both the base station and the UE, it is unnecessary to indicate the number of bits in the DCI.

The UE may determine an index of the PUCCH resource (i.e., an ID of the PUCCH resource) used in a PUCCH resource set based on the value carried in the PRI information field in the DCI. In some special situations, the ID of the PUCCH resource may be determined by combining a control channel resource for carrying the DCI.

If a dynamic HARQ-ACK codebook feedback is used, the DCI for scheduling the PDSCH further includes the DAI field. The DAI is used to indicate the number of PDSCHs whose HARQ-ACK information is fed back in a same HARQ-ACK codebook. In an existing protocol, the DAI field of the DCI has two bits indicating the number by a modulo operation on 4, as illustrated in FIG. 7.

Figure 7:
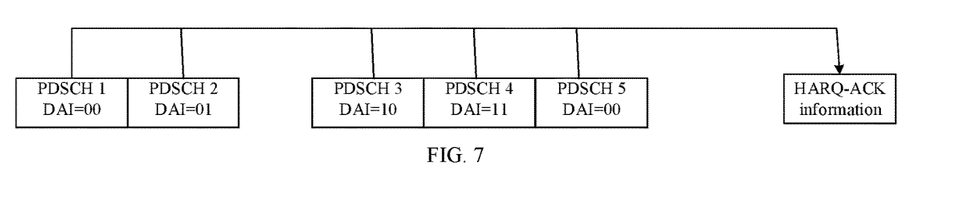
FIG. 7 is a schematic diagram illustrating DCI scheduling a PDSCH transmission and DCI scheduling a HARQ-ACK transmission according to an embodiment of the disclosure.

In FIG. 7, the DAI field has 2 bits, and the 2 bits may carry four values, including "00", "01", "10" and "11". PDSCH1, PDSCH2, PDSCH3, PDSCH4 in FIG. 7 are scheduling numbers of the PDSCH transmission.

In the 5G NR-U, a sending terminal firstly performs a channel listening, and occupies the channel to send data when finding that the channel has no interference. A time period of occupying the channel is no longer than a maximum occupancy time, for example 8 ms or the like. The PDSCH transmission is performed nearly at the end of the channel occupied time (COT). The base station cannot schedule the UE to feedback the HARQ-ACK information within the COT, because a demodulation of the PDSCH takes a period of time and the maximum occupancy time is exceeded after the PDSCH is completely demodulated. The base station typically sets a non-numerical K1 value in the DCI corresponding to the PDSCH transmission, to represent that the DCI does not indicate a position of the HARQ-ACK feedback resource of the PDSCH. The non-numerical value is the aforementioned first value.

The feedback resource of the PDSCH transmission is determined by the first scheduling DCI indicating a normal numerical K1 value when the base station occupies the channel next time. Even within one COT, the base station may set a non-numerical K1 value in the DCI, and set a normal numerical K1 value for indicating the position of the HARQ-ACK feedback resource in a subsequent DCI with the COT.

Figure 8:
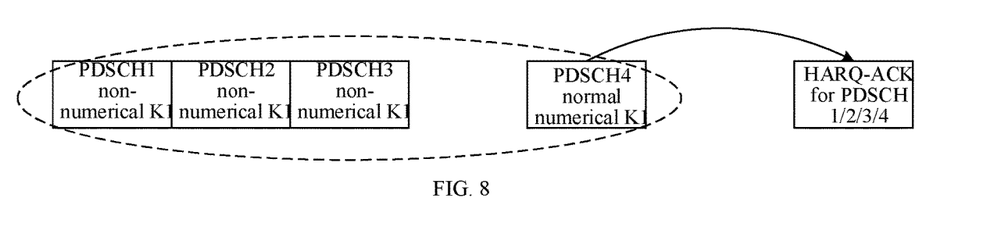
FIG. 8 is a schematic diagram illustrating DCI scheduling a PDSCH transmission and DCI scheduling a HARQ-ACK transmission according to an embodiment of the disclosure.

The above non-numerical K1 value is a specific code point of K1. For example, K1 has 3 bits in total, which may represent a value range of 0-7. It may be agreed that when K1=0, it indicates a non-numerical value, and when K1=1-7, it indicates a normal numerical K1 value, i.e., the number of time slots between the time slot of the PDSCH transmission and the time slot of the transmission of the HARQ-ACK information, as illustrated in FIG. 8.

Figure 9:
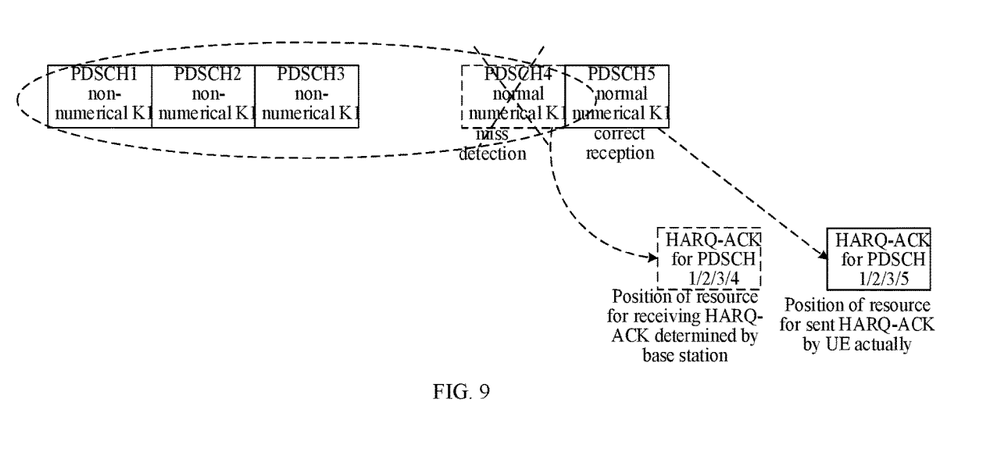
FIG. 9 is a schematic diagram illustrating DCI scheduling a PDSCH transmission and DCI scheduling a HARQ-ACK transmission according to an embodiment of the disclosure.

As illustrated in FIG. 9, if a miss detection of the UE occurs in the first DCI carrying the normal numerical K1 value (i.e., the DCI corresponding to the PDSCH4, correspondingly, a miss detection occurs in the PDSCH4), the UE may use the HARQ-ACK feedback resource indicated in the DCI carrying a normal numerical K1 value secondly sent by the base station (i.e., the DCI corresponding to the PDSCH5) as the resource for sending the HARQ-ACK information. However, since the base station does not know the miss detection of the UE, the base station cannot receive the HARQ-ACK information at a position of its expected resource. Further since the UE incorrectly occupies the HARQ-ACK transmission resource, the UE may occupy uplink resources originally allocated to another UE, thus resulting in an error in the uplink transmission of another UE.

Figure 10:
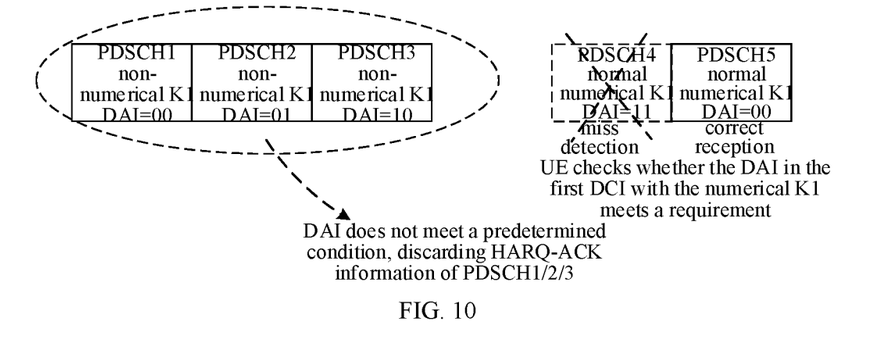
FIG. 10 is a schematic diagram illustrating DCI scheduling a PDSCH transmission and DCI scheduling a HARQ-ACK transmission according to an embodiment of the disclosure.

After the UE receives one or more DCIs each carrying a non-numerical K1 value used by the base station and one or more PDSCH transmissions scheduled by such DCIs, if the UE receives an immediately subsequent DCI carrying a normal numerical K1 value, the DCI schedules the PDSCH transmission which is sent to the UE, and the DAI field in the DCI carries a circulation of the DAI field in a last DCI carrying a non-numerical K1 value plus 1, it indicates that no miss detection occurs in any DCI, and the resource for transmitting the HARQ-ACK information indicated by the DCI carrying the normal numerical K1 value can be used by the UE to feedback the HARQ-ACK information of the aforementioned multiple PDSCH transmissions. If the DAI fields included in two DCIs do not meet the predetermined condition, it indicates that a miss detection occurs in a DCI. The UE does not feedback the HARQ-ACK information corresponding to one or more PDSCHs scheduled by the aforementioned one or more DCIs each carrying a non-numerical K1 value, as illustrated in FIG. 10. The situation where the UE incorrectly occupies the uplink transmission resource may not occur.

A communication device is provided according to an embodiment of the disclosure, includes an antenna, a memory and a processor. The processor is coupled respectively to the antenna and the memory. The processor is configured to execute computer executable instructions stored on the memory, control the antenna to receive and send wireless signals, and implement the method for transmitting HARQ-ACK information provided in any of the aforementioned technical solutions, for example, at least one of the methods described with reference to FIG. 2 to FIG. 4.

The embodiments of the disclosure provide a computer non-transitory storage medium. The computer non-transitory storage medium stores with computer executable instructions. The computer executable instructions are executed by a processor, and a method for transmitting HARQ-ACK information provided in any of the aforementioned technical solutions can be implemented, for example at least one of the methods described with reference to FIG. 2 to FIG. 4 can be implemented.

Figure 11:
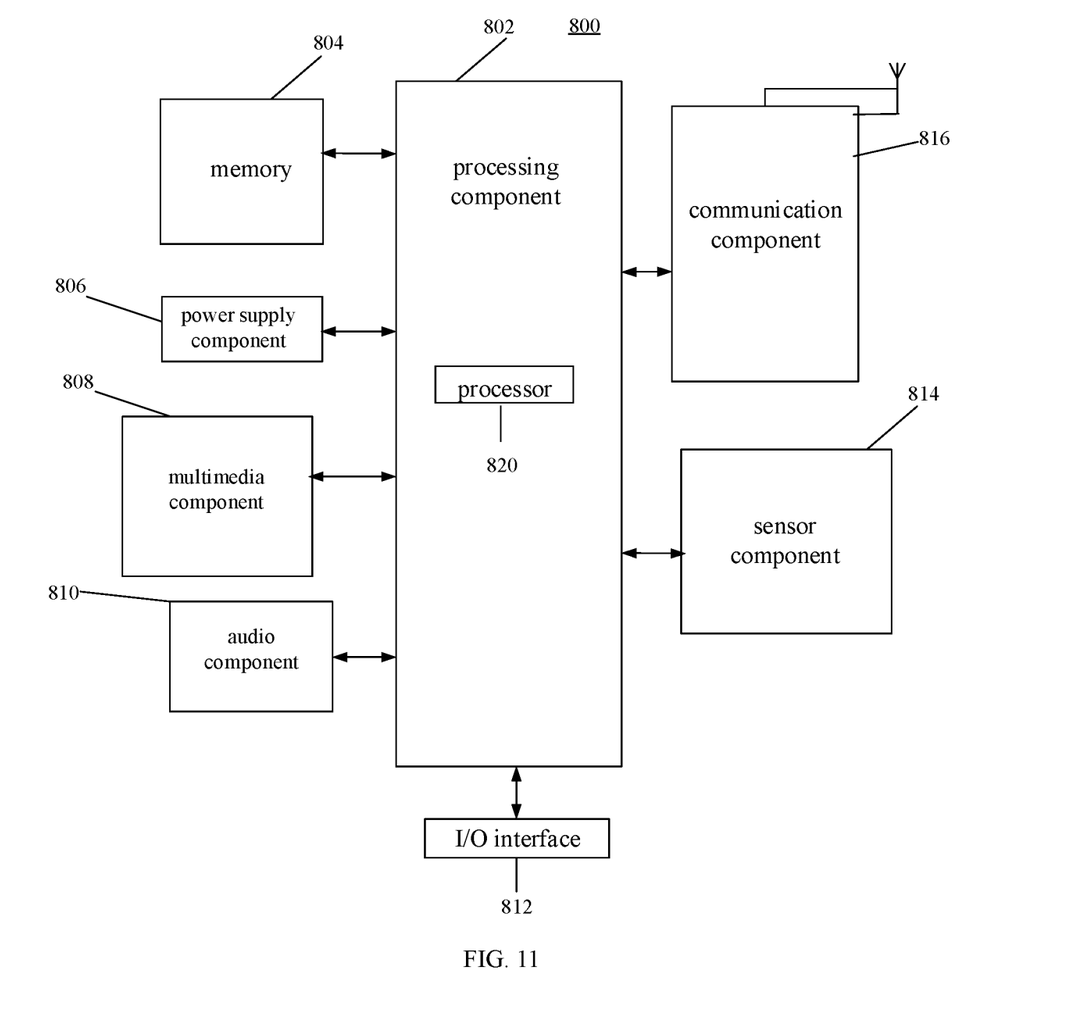
FIG. 11 is a block diagram illustrating a UE according to an embodiment of the disclosure.

FIG. 11 is a block diagram illustrating a UE according to an embodiment. For example, the UE may be a mobile phone, a computer, a digital broadcasting UE, a messaging device, a game console, a tablet device, a medical equipment, a fitness equipment, a personal digital assistant, and so on.

Referring to FIG. 11, the UE 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the UE 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the UE 800. Examples of the data include the instructions of any applications or methods operated on the UE 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the UE 800. The power supply component 806 may include a power supply management system, one or more power supplies, and other units related to generating, managing and distributing power for the UE 800.

The multimedia component 808 includes an output interface screen provided between the UE 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the UE 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the UE 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the UE 800. For example, the sensor component 814 may detect the on/off state of the UE 800 and the relative positioning of the component. For example, the component is a display and a keypad of the UE 800. The sensor component 814 may further detect the location change of the UE 800 or one component of the UE 800, the presence or absence of contact between the user and the UE 800, the orientation or acceleration/deceleration of the UE 800, and the temperature change of the UE 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the UE 800 and other devices. The UE 800 may access wireless networks based on communication standard, such as Wi-Fi, 2G or 3G, or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the UE 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 804 including executable instructions, the executable instructions may be executed by the processor 820 of the UE 800 to complete the above methods. For example, the non-transitory computer-readable storage medium may be a ROM, a random access memory (RAM), a CD-ROM, a magnetic tape, a floppy disk, an optical data storage device, etc.

Figure 12:
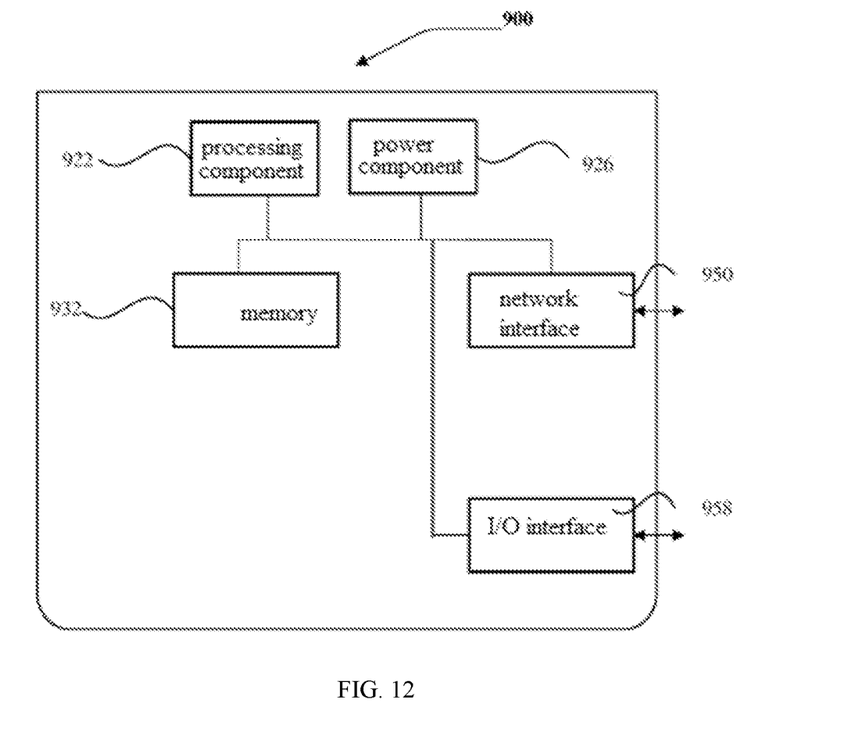
FIG. 12 is a block diagram illustrating a base station according to an embodiment of the disclosure.

FIG. 12 is a block diagram illustrating a base station according to an embodiment. As illustrated in FIG. 9, the base station 900 includes a processing component 922, which further includes one or more processors, and a memory resource represented by a memory 932, for storing instructions executable by the processing component 922, such as an application program. The application program stored in the memory 932 may include one or more modules each corresponding to a set of instructions. In addition, the processing component 922 is configured to execute the instructions to perform any of the methods described with reference to FIG. 2 to FIG. 4.

The base station 900 may also include a power component 926 configured to perform power management of the base station 900, a wired or wireless network interface 950 configured to connect the base station 900 to a network, and an input output (I/O) interface 958. The base station 900 can operate based on an operating system stored in the memory 932, such as Windows Server™, Mac OS X™, Unix™, Linux™, FreeBSD™ or the like.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

The invention claimed is:

1. A method for transmitting hybrid automatic repeat request acknowledgement (HARQ-ACK) information, comprising:
receiving first downlink control information (DCI), wherein a slot offset information field of the first DCI has a first value;
receiving second DCI, wherein a slot offset information field of the second DCI has a second value different from the first value; and
sending HARQ-ACK information of a physical downlink shared channel (PDSCH) transmission scheduled by the first DCI based on the second DCI, in response to determining that a value of a downlink assignment index (DAI) field comprised in the second DCI and a value of a DAI field comprised in the first DCI meet a predetermined condition;

wherein, the value of the DAI field comprised in the first DCI is M1, and the value of the DAI field comprised in the second DCI is M2, where both M1 and M2 are natural numbers, determining that the value of the DAI field comprised in the second DCI and the value of the DAI field comprised in the first DCI meet the predetermined condition comprises:

determining that the value of the DAI field comprised in the second DCI and the value of the DAI field comprised in the first DCI meet the predetermined condition in response to M2=(M1+1) mod N, where N is a number of values that can be indicated by the DAI field.

2. The method of claim 1, further comprising:
discarding sending the HARQ-ACK information of the PDSCH transmission scheduled by the first DCI in response to determining that the value of the DAI field comprised in the second DCI and the value of the DAI field comprised in the first DCI do not meet the predetermined condition.

3. A method for transmitting HARQ-ACK information, comprising:
transmitting first DCI, wherein a slot offset information field of the first DCI has a first value;
transmitting second DCI, wherein a slot offset information field of the second DCI has a second value different from the first value, wherein when the second DCI is used to transmit HARQ-ACK information of a physical downlink shared channel (PDSCH) transmission scheduled by the first DCI, a value of a downlink assignment index (DAI) field comprised in the second DCI and a value of a DAI field comprised in the first DCI meet a predetermined condition; and
receiving the HARQ-ACK information of the PDSCH transmission scheduled by the first DCI based on the second DCI, in response to determining that the value of the DAI field comprised in the second DCI and the value of the DAI field comprised in the first DCI meet the predetermined condition;
wherein, the value of the DAI field comprised in the first DCI is M1, and the value of the DAI field comprised in the second DCI is M2, where both M1 and M2 are natural numbers,
determining that the value of the DAI field comprised in the second DCI and the value of the DAI field comprised in the first DCI meet the predetermined condition comprises:
determining that the value of the DAI field comprised in the second DCI and the value of the DAI field comprised in the first DCI meet the predetermined condition in response to M2=(M1+1) mod N, where N is a number of values that can be indicated by the DAI field.

4. A communication device, comprising:
a receiver;
a memory;
a processor respectively coupled to the receiver and the memory, configured to execute computer executable instructions stored on the memory, control the receiver to receive and send wireless signals, and implement the method according to claim 3.

5. A communication device, comprising:
a receiver;
a memory;
a processor respectively coupled to the receiver and the memory, configured to execute computer executable instructions stored on the memory, control the receiver to receive and send wireless signals, and implement a method for transmitting hybrid automatic repeat request acknowledgement (HARQ-ACK) information, comprising:
receiving first downlink control information (DCI), wherein a slot offset information field of the first DCI has a first value;
receiving second DCI, wherein a slot offset information field of the second DCI has a second value different from the first value; and
sending HARQ-ACK information of a physical downlink shared channel (PDSCH) transmission scheduled by the first DCI based on the second DCI, in response to determining that a value of a downlink assignment index (DAI) field comprised in the second DCI and a value of a DAI field comprised in the first DCI meet a predetermined condition;
wherein, the value of the DAI field comprised in the first DCI is M1, and the value of the DAI field comprised in the second DCI is M2, where both M1 and M2 are natural numbers,
determining that the value of the DAI field comprised in the second DCI and the value of the DAI field comprised in the first DCI meet the predetermined condition comprises:
determining that the value of the DAI field comprised in the second DCI and the value of the DAI field comprised in the first DCI meet the predetermined condition in response to M2=(M1+1) mod N, where N is a number of values that can be indicated by the DAI field.

6. The communication device of claim 5, wherein the processor is further configured to implement:
discarding sending the HARQ-ACK information of the PDSCH transmission scheduled by the first DCI in response to determining that the value of the DAI field comprised in the second DCI and the value of the DAI field comprised in the first DCI do not meet the predetermined condition.

* * * * *